(12) United States Patent
Niu

(10) Patent No.: US 12,470,463 B2
(45) Date of Patent: Nov. 11, 2025

(54) DATA PROCESSING METHOD AND DEVICE

(71) Applicant: ZTE Corporation, Shenzhen (CN)

(72) Inventor: Xiaobing Niu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 296 days.

(21) Appl. No.: 18/017,429

(22) PCT Filed: May 18, 2021

(86) PCT No.: PCT/CN2021/094301
§ 371 (c)(1),
(2) Date: Jan. 23, 2023

(87) PCT Pub. No.: WO2022/016969
PCT Pub. Date: Jan. 27, 2022

(65) Prior Publication Data
US 2023/0275807 A1    Aug. 31, 2023

(30) Foreign Application Priority Data
Jul. 23, 2020   (CN) .......................... 202010719569.9

(51) Int. Cl.
*H04L 41/12* (2022.01)
*H04L 41/0803* (2022.01)

(52) U.S. Cl.
CPC .......... *H04L 41/12* (2013.01); *H04L 41/0803* (2013.01)

(58) Field of Classification Search
None
See application file for complete search history.

(56) References Cited

U.S. PATENT DOCUMENTS

2015/0365294 A1    12/2015 Khan et al.
2016/0088601 A1*    3/2016 Liu ..................... H04W 72/044
                                                    370/329
(Continued)

FOREIGN PATENT DOCUMENTS

CN    104113791 A    10/2014
CN    105991430 A    10/2016
(Continued)

OTHER PUBLICATIONS

International Search Report for corresponding application PCT/CN2021/094301 filed May 18, 2021; Mail date Aug. 16, 2021.
(Continued)

*Primary Examiner* — Mohamed Ibrahim
(74) *Attorney, Agent, or Firm* — CANTOR COLBURN LLP (57) ABSTRACT

Provided are a data processing method and apparatus. The method includes: receiving a first data processing request, wherein the first data processing request carries data collection information and/or configuration information; determining a target management and control component; generating a second data processing request according to the first data processing request; and sending the second data processing request to the target management and control component, wherein the target management and control component is used for collecting data or configuring according to the second data processing request. The present disclosure can solve the problem in the related art of how to perform data processing for a management and control system on the basis of a user request, thereby implementing data processing on the basis of a user request.

16 Claims, 4 Drawing Sheets

(56) References Cited

U.S. PATENT DOCUMENTS

| | | | |
|---|---|---|---|
| 2016/0261493 A1* | 9/2016 | Li | H04L 45/021 |
| 2016/0330076 A1 | 11/2016 | Tiwari et al. | |
| 2019/0253318 A1* | 8/2019 | Leng | H04L 43/50 |
| 2020/0053025 A1* | 2/2020 | Evans | H04L 69/22 |
| 2023/0384982 A1* | 11/2023 | Ki | G06F 3/0659 |

FOREIGN PATENT DOCUMENTS

| | | |
|---|---|---|
| CN | 107360100 A | 11/2017 |
| CN | 107360115 A | 11/2017 |
| CN | 107872338 A | 4/2018 |
| CN | 108462633 A | 8/2018 |
| CN | 108712308 A | 10/2018 |
| CN | 111165019 A | 5/2020 |
| CN | 111371593 A | 7/2020 |
| CN | 112491574 A | 3/2021 |
| WO | 2007019727 A1 | 2/2007 |
| WO | 2018219322 A1 | 12/2018 |

OTHER PUBLICATIONS

Chinese Office Action for Application No. 202010719569.9, dated May 7, 2024, 21 pages with translation.
European Search Report for Application No. 21846800.7, dated Nov. 27, 2023, 9 pages.
Liping Chen: "T17-SG13-200720-TD-WP1-0582!!MSW-E;TD572/PLEN" ITU-T Draft; Study Period 2017-2020; Study Group 13, Series TD572/PLEN, International Telecommunication Union, vol. 12/15, 14/15, Jul. 22, 2020, pp. 1-75, XP044296909.

* cited by examiner

DATA PROCESSING METHOD AND DEVICE

CROSS-REFERENCE TO RELATED APPLICATION

The present disclosure claims priority to Chinese Patent Application No. CN202010719569.9, filed on Jul. 23, 2020, and entitled "data processing method and apparatus", the disclosure of which is hereby incorporated by reference in its entirety.

TECHNICAL FIELD

The embodiments of the present disclosure relate to the field of communications, and in particular, to a data processing method and apparatus.

BACKGROUND

A distributed controller, such as an automatically switched optical network (ASON), can complete distributed connection scheduling through interactions among control components on the basis of a mechanism such as signaling, routing and automatic discovery. It has advantages such as distributed processing and flexible network dynamic control.

A centralized controller, such as a software defined network controller (SDN controller), implements centralized connection scheduling by using control components such as a connection controller (CC) and a routing controller (RC) on the basis of a logic centralized control architecture. Due to the global network resource information and cooperative processing of all connection requests, resource configuration can be optimized on the whole.

Figure 1:
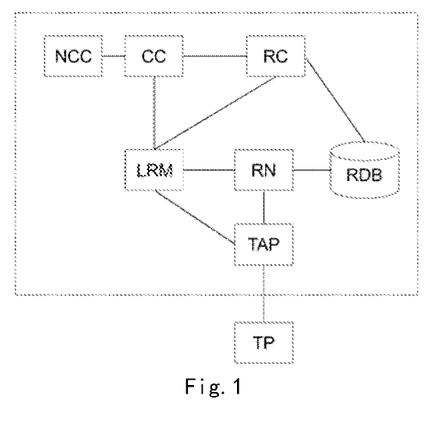
FIG. 1 is a schematic diagram of relevant components of an SDN controller in the related art.

FIG. 1 is a schematic diagram of related assemblies of an SDN controller in the related art. As shown in FIG. 1, the system includes a network call controller (NCC), a link resources manager (LRM), a connection controller, a routing controller (RC), a notification, a termination and adaptation performer (TAP), etc., and a forwarding plane device network element connected to the TAP.

Considering that a network management function is essentially the same as a control function, the distributed controller, the centralized controller and the network management system are collectively referred to as a management and control system (MCS). The MCS includes a management and control component (MC), the management and control function is executed by the management and control component (hereinafter, for brief description, the management and control component is referred to as MC component).

In a software-defined network controller (SDN controller) architecture, a client context represents a component in a server controller, and the component performs an interactive service for a management and control service between a client controller and a service controller. The service context represents a component in the client controller, and the component performs an interactive service for the management and control service between the client controller and the service controller.

In order to further optimize the operation efficiency of the controller and satisfy the service requirements of external clients, the operation data inside the controller also needs to be accurately grasped, and analysis on the basis of relevant data will facilitate improvement of the network control flow and optimization of the control efficiency, providing users with more insight to improve the network performance.

In the MCS, such as an SDN controller or a control plane, how to perform data processing on the basis of a user request, such as data collection, analysis and policy decision, which components perform relevant interaction, and what the specific interaction content is are problems that need to be explicitly determined.

SUMMARY

The embodiments of the present disclosure provide a data processing method and apparatus, so as to at least solve the problem in the related art of how to perform data processing for a management and control system on the basis of a user request.

According to one embodiment of the present disclosure, provided is a data processing method, including:
  receiving a first data processing request, wherein the first data processing request carries data collection information and/or configuration information;
  determining a target management and control component;
  generating a second data processing request according to the first data processing request; and
  sending the second data processing request to the target management and control component, wherein the target management and control component is used for collecting data or configuring according to the second data processing request.

In an exemplary embodiment, determining the target management and control component includes:
  determining a first management and control component according to the data collection information, wherein the first management and control component is used for collecting data according to the second data processing request, and the target management and control component is the first management and control component; and/or
  determining a second management and control component according to the configuration information, wherein the second management and control component is configured according to the second data processing request, and the target management and control component is the second management and control component.

In an exemplary embodiment, determining the first management and control component according to the data collection information includes:
  determining the first management and control component on the basis of the first data processing request and directory service information of a management and control component, or determining that a management and control component indicated by the data collection information is the first management and control component.

In an exemplary embodiment, determining the second management and control component according to the configuration information includes:
  determining the second management and control component on the basis of the first data processing request and the directory service information of the management and control component; or determining that the management and control component indicated by the configuration information is the second management and control component.

In an exemplary embodiment, generating a second data processing request according to the first data processing request includes:

in cases where the target management and control component is the first management and control component, generating a data collection request according to the data collection information, wherein the second data processing request is the data collection request, and the data collection request further carries at least one of the following: the type of data to be collected, the start and end time of data update, and the transmission manner of collected data; and in cases where the target management and control component is the second management and control component, generating a configuration request according to the configuration information or generating the configuration request according to the configuration information and a data processing result returned by the first management and control component, wherein the second data processing request is the configuration request, and the configuration request carries a configuration interface and parameters.

In an exemplary embodiment, the type of data includes at least one of the following: link occupation ratio and/or topology.

In an exemplary embodiment, receiving the first data processing request includes: receiving the first data processing request sent by a network call controller; or receiving the first data processing request sent by client context; or receiving the first data processing request sent by a protocol controller.

In an exemplary embodiment, after sending the second data processing request to the target management and control component, the method further includes:

receiving a data processing result returned by the target management and control component; and sending the data processing result to the network call controller, the client context or the protocol controller.

In another exemplary embodiment, the first management and control component includes a link resources manager (LRM), a routing controller (RC), a connection controller (CC), a network call controller (NCC), a routing database (RDB) and a termination and adaptation performer (TAP), and the second management and control component includes a link resources manager (LRM), a routing controller (RC), a connection controller (CC), a network call controller (NCC), a routing database (RDB) and a termination and adaptation performer (TAP).

According to some other embodiments of the present disclosure, further provided is a data processing apparatus, including:

a first receiving module, configured to receive a first data processing request, wherein the first data processing request carries data collection information and/or configuration information;

a determination module, configured to determine a target management and control component;

a generation module configured to generate a second data processing request according to the first data processing request; and a first sending module, configured to send the second data processing request to the target management and control component, wherein the target management and control component is used for collecting data or configuring according to the second data processing request.

In an exemplary embodiment, the determination module includes:

a first determination submodule, configured to determine a first management and control component according to the data collection information, wherein the first management and control component is used for collecting data according to the second data processing request, and the target management and control component is the first management and control component; and/or a second determination submodule, configured to determine a second management and control component according to the configuration information, wherein the second management and control component is configured according to the second data processing request, and the target management and control component is the second management and control component.

In an exemplary embodiment, the first determination submodule is further configured to:

determine the first management and control component on the basis of the first data processing request and directory service information of a management and control component, or determine that a management and control component indicated by the data collection information is the first management and control component.

In an exemplary embodiment, the second determination submodule is further configured to:

determine the second management and control component on the basis of the first data processing request and the directory service information of the management and control component; or determine that the management and control component indicated by the configuration information is the second management and control component.

In an exemplary embodiment, the generation module includes:

a first generation submodule, configured to generate, in cases where the target management and control component is the first management and control component, a data collection request according to the data collection information, wherein the second data processing request is the data collection request, and the data collection request further carries at least one of the following: the type of data to be collected, the start and end time of data update, and the transmission manner of collected data; and a second generation submodule, configured to generate, in cases where the target management and control component is the second management and control component, a configuration request according to the configuration information or generating the configuration request according to the configuration information and a data processing result returned by the first management and control component, wherein the second data processing request is the configuration request, and the configuration request carries a configuration interface and parameters.

In an exemplary embodiment, the type of data includes at least one of the following: link occupation ratio and/or topology.

In an exemplary embodiment, the first receiving module includes:

a first receiving submodule, configured to receive the first data processing request sent by the network call controller; or a second receiving submodule, configured to receive the first data processing request sent by the client context; or a third receiving submodule, configured to receive the first data processing request sent by the protocol controller.

In an exemplary embodiment, after sending the second data processing request to the target management and control component, the apparatus further includes:
- a second receiving module, configured to receive a data processing result returned by the target management and control component; and
- a second sending module, configured to send the data processing result to the network call controller, the client context or the protocol controller.

In another exemplary embodiment, the first management and control component includes a link resources manager (LRM), a routing controller (RC), a connection controller (CC), a network call controller (NCC), a routing database (RDB) and a termination and adaptation performer (TAP), and the second management and control component includes a link resources manager (LRM), a routing controller (RC), a connection controller (CC), a network call controller (NCC), a routing database (RDB) and a termination and adaptation performer (TAP).

According to still some other embodiments of the present disclosure, further provided is a computer-readable storage medium, the computer-readable storage medium storing a computer program, wherein the computer program is configured to execute the method according to any one of the described method embodiments when running.

According to still some other embodiments of the present disclosure, further provided is an electronic device, including a memory and a processor, wherein the memory stores a computer program, and the processor is configured to run the computer program so as to execute the method according to any one of the described method embodiments.

By means of the present disclosure, a first data processing request is received, a target management and control component is determined on the basis of information carried in the first data processing request, a second data processing request is generated according to the first data processing request, and the second data processing request is sent to the target management and control component for processing. The problem in the related art of how to process data for a management and control system on the basis of a user request can be solved, and data processing on the basis of a user request is realized.

DETAILED DESCRIPTION OF THE EMBODIMENTS

Hereinafter, embodiments of the present disclosure are described in detail with reference to the accompanying drawings and in conjunction with the embodiments.

It should be noted that the terms "first", "second" etc., in the description, claims, and accompanying drawings of the present disclosure are used to distinguish similar objects, and are not necessarily used to describe a specific sequence or order.

Figure 2:
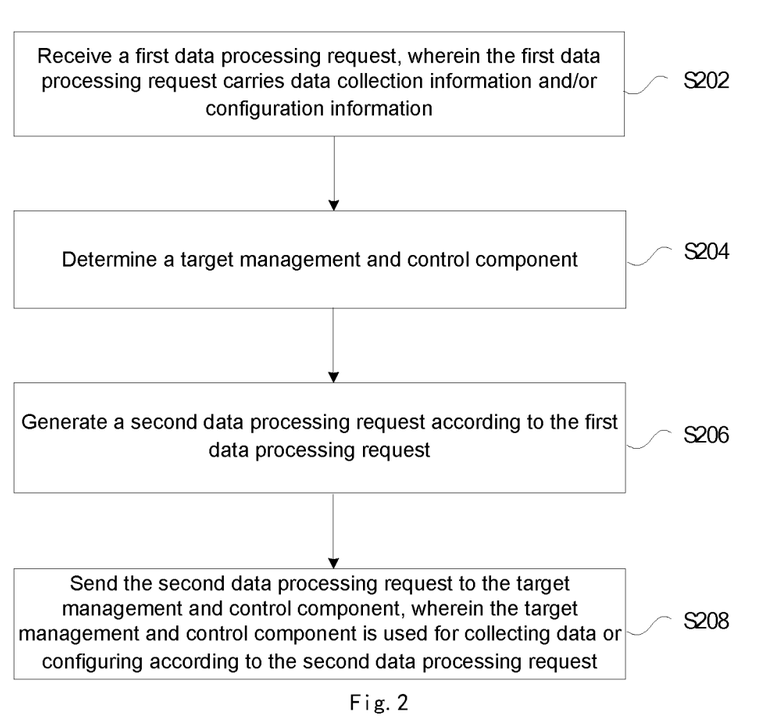
FIG. 2 is a flowchart of a data processing method according to some embodiments of the present disclosure.

The present embodiment provides a data processing method running in a network device. FIG. 2 is a flowchart of a data processing method according to some embodiments of the present disclosure. As shown in FIG. 2, the flow includes the following steps:

step S202, receive a first data processing request, wherein the first data processing request carries data collection information and/or configuration information.

In an exemplary embodiment, the foregoing step S202 may specifically include: receiving the first data processing request sent by a network call controller; receiving the first data processing request sent by client context; or receiving the first data processing request sent by a protocol controller.

Step S204, determine a target management and control component.

Step S206, generate a second data processing request according to the first data processing request.

Step S208: send the second data processing request to the target management and control component, wherein the target management and control component is used for collecting data or configuring according to the second data processing request.

By means of steps S202 to S208, a first data processing request is received, a target management and control component is determined on the basis of information carried in the first data processing request, a second data processing request is generated according to the first data processing request, and the second data processing request is sent to the target management and control component for processing, the problem in the related art of how to process data for a management and control system on the basis of a user request can be solved, and data processing on the basis of a user request is realized.

In an exemplary embodiment, the foregoing step S202 may specifically include:
- determining a first management and control component according to the data collection information; further, determining the first management and control component on the basis of the first data processing request and directory service information of a management and control component; or determining that a management and control component indicated by the data collection information is the first management and control component, wherein the first management and control component is used for collecting data according to the second data processing request, and the target management and control component is the first management and control component; and/or
- determining a second management and control component according to the configuration information, and further determining the second management and control component on the basis of the first data processing request and directory service information of the management and control component; or determining that the management and control component indicated by the configuration information is the second management and control component, wherein the second management and control component is configured according to the second data processing request, and the target management and control component is the second management and control component. In an exemplary embodiment, the first management and control component may specifically include: a link resources manager (LRM), a routing controller (RC), a connection controller (CC), a network call controller (NCC), a routing database (RDB) and a termination and adaptation performer (TAP), and the second management and control assembly includes a link resources manager (LRM), a routing controller (RC), a connection controller (CC), a network call controller (NCC), a routing database (RDB) and a termination and adaptation performer (TAP).

In an exemplary embodiment, the foregoing step S206 may specifically include:

in cases where the target management and control component is the first management and control component, generating a data collection request according to the data collection information, wherein the second data processing request is the data collection request, and the data collection request further carries at least one of the following: the type of data to be collected, the start and end time of data update, and the transmission manner of collected data; and in cases where the target management and control component is the second management and control component, generating a configuration request according to the configuration information or generating the configuration request according to the configuration information and a data processing result returned by the first management and control component, wherein the second data processing request is the configuration request, and the configuration request carries a configuration interface and parameters.

In an exemplary embodiment, the type of data includes at least one of the following: link occupation ratio and/or topology, wherein the link occupation ratio may be an Ethernet link occupation ratio, an SDH link occupation ratio, etc.

In an exemplary embodiment, after the second data processing request is sent to the target management and control component, a data processing result returned by the target management and control component is received, and the data processing result is sent to the network call controller, the client context, or the protocol controller.

The source management and control component in the present embodiment refers to a management and control component responsible for collecting data, and the destination management and control component is a management and control component responsible for executing a specified configuration command.

The present embodiment provides a data processing method, including:

Step 1, after receiving a first data processing request, determine a source management and control component to be interacted with; and determine, according to data collection information in the first data processing request, a source management and control component to be interacted with. The data collection information may include the type of data to be collected, a management and control component that provides the data, etc.

In an embodiment, the source management and control component to be interacted with is determined on the basis of the directory service information between the data collection information in the first data processing request and the source management and control component.

In an embodiment, the data collection information in the first data processing request indicates a source management and control component to be interacted with;

in an embodiment, the first data processing request is from a network call controller;

in an embodiment, the first data processing request is from client context;

in an embodiment, the first data processing request is from a protocol controller.

Step 2, if there is a source management and control component, generate a second data processing request; otherwise, proceed to Step 5.

In an embodiment, according to the data collection information in the first data processing request and the source management and control component determined in Step 1, it is determined that the second data processing request carries the type of data to be collected, the start and end time of data update, the transmission manner of collected data, such as returning data in real time and periodically updating.

Step 3, send the second data processing request to a source management and control component.

In an embodiment, the sending sequence of the second data processing request is controlled according to the workflow of the source management and control component.

Step 4, the source management and control component processes the received data processing request, and returns the collected data.

In an embodiment, the source management and control component collects data complying with a collection standard.

further, the returned data is sent to the network call controller;

further, the returned data is sent to the client context;

further, the returned data is sent to the protocol controller.

Step 5, determine a destination management and control component to be interacted with, and if there is a destination management and control component, generate a third data processing request; otherwise, proceed to Step 8.

In an embodiment, the destination management and control component to be interacted with is determined on the basis of the directory service information between configuration information in the first data processing request and a destination management and control component.

In an embodiment, the configuration information in the first data processing request indicates a destination management and control component to be interacted with.

In an embodiment, the data returned by the source management and control component is analyzed, and a destination management and control component to be interacted with is determined.

Configuration information in the third data processing request is determined according to the configuration information in the first data processing request. The configuration information may include: a management and control component to be configured, a set to be configured, etc. The third data processing request includes a configuration interface and parameters.

Step 6, send the third data processing request to a destination management and control component.

In an embodiment, the sending sequence of the third data processing request is controlled according to the workflow of the destination management and control component.

Step 7, the destination management and control component processes the third data processing request, and returns an execution result.

further, the execution result is sent to the network call controller;
further, the execution result is sent to the client context;
further, the execution result is sent to the protocol controller.

Step 8: end.

The data controller in the present embodiment is configured to determine, after receiving a first data processing request, a source management and control component to be interacted with; generate a second data processing request; send the second data processing request to a source management and control component; determine a destination management and control component to be interacted with and a third data processing request; and send a third data processing request to the destination management and control component.

The source management and control component (corresponding to the described first management and control component) is used for receiving a second data processing request. In an embodiment, the second data processing request carries data collection standards such as the type of data to be collected and the start and end time of data update. In addition, the data collecting standard further includes the transmission manner of collected data, such as returning data in real time and periodically updating. According to the second data processing request, data meeting a collection standard is connected; and the collected data is returned.

The destination management and control component (corresponding to the described second management and control component) is configured to receive a third data processing request, process the third data processing request, and return an execution result to the data controller.

In the present embodiment, the static OTN link topology data and the historical topology data from the RDB need to be collected, and the dynamic topology data from the RC needs to be collected, wherein the static topology data refers to topology data configured by a network manager; different topologies exist at different moments in the past, and these compose a historical topology; the dynamic topology is a topology that is dynamically maintained through a routing protocol or centralized control. For example, after a link resource changes, the topology is dynamically refreshed according to a resource change situation.

Figure 3:
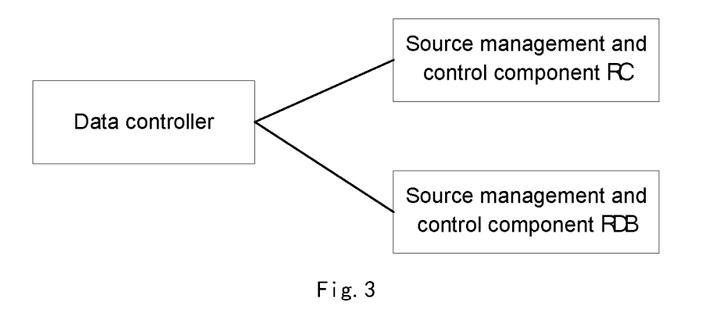
FIG. 3 is block diagram 1 showing a data processing apparatus according to the present preferred embodiment.

FIG. 3 is a block diagram 1 of a data processing apparatus according to the preferred embodiment of the present disclosure. As shown in FIG. 3, the apparatus includes:

Step 1, after receiving a first data processing request, determine a source management and control component to be interacted with.

In an embodiment, the source management and control component to be interacted with is determined on the basis of the directory service information between the first data processing request and the source management and control component.

In the present embodiment, the data controller may collect data from the RDB and the RC according to the topology collection request in the first data processing request and the directory service configuration among the management and control components, wherein both the RDB and the RC are source management and control components. In the present embodiment, the directory service configuration maintains a data collection request which includes a correlation between the topology collection request and the management and control component.

In addition to route data provided by the RDB and the RC, an LRM component can at least provide the allocation and usage condition of current link resources, and a local link topology; the NCC can at least provide the number of currently maintained calls and specific information of the calls, such as bandwidth and running time; the CC component can at least provide currently maintained connection data, such as the number of node hops through which the current connection passes, and the execution condition of connection protection recovery; the TAP component can at least provide a binding relationship between a forwarding point and a subnetwork point, indicating whether the resources are dedicated or shared. All these management and control components may serve as the source management and control component.

Step 2, if there is a source management and control component, generate a second data processing request; otherwise, proceed to Step 5.

In an embodiment, the second data processing request carries data collection standards such as the type of data to be collected and the start and end time of data update. In addition, the data collecting standard further includes the transmission manner of collected data, such as returning data in real time and periodically updating.

In the present embodiment, the source management and control component is an RDB and an RC. In the generated second data processing request, the type of data is a topology, specifically an OTN topology, and other types of data further include an Ethernet link topology, a WDM topology, ect.

Step 3, send the second data processing request to a source management and control component.

In an embodiment, the sending sequence of the second data processing request is controlled according to the workflow of the source management and control component.

In the present embodiment, the data controller sends the second data processing request to the source management and control component RC and RDB.

Step 4, the source management and control component processes the received data processing request, and returns the collected data.

Step 5, determine a destination management and control component to be interacted with, and if there is a destination management and control component, generate a third data processing request; otherwise, end.

In the present embodiment, the data controller receives an external request to drive the RC module to start the rerouting optimization.

Step 1, after receiving a first data processing request, determine a source management and control component to be interacted with.

In the present embodiment, there is no source management and control component, and therefore the process jumps to Step 5.

Step 5, determine a destination management and control component to be interacted with, and if there is a destination management and control component, generate a third data processing request according to the first data processing request; otherwise, proceed to Step 8.

In an embodiment, the configuration information in the first data processing request may include a type of destination data and a configuration set, and the third data processing request includes a configuration interface and parameters. A destination management and control component to interact with is determined on the basis of the directory service information between the type of destination data in the configuration information in the first data processing request and a destination management and control component. The configuration set in the first data processing request is converted into a configuration interface and parameters in the third data processing request.

In the present embodiment, if the type of destination data is route optimization, and the configuration set is the connection identifier to be optimized, the third data processing request includes: the configuration interface being starting rerouting, and the parameter is the link identifier in the configuration set. A destination management and control component to interact with is determined as an RC on the basis of the type of destination data, i.e. routing optimization, in the configuration information in the first data processing request and the directory service information among destination management and control components. The configuration set in the first data processing request is converted into a configuration interface and parameters in the third data processing request.

In another embodiment, the configuration information in the first data processing request can further include a destination management and control component and a configuration set, and the third data processing request includes a configuration interface and parameters. 0 the basis of the destination management and control component in the configuration information in the first data processing request, configuration set in the first data processing request is converted into the configuration interface and the parameters in the third data processing request.

In another embodiment, the configuration information in the first data processing request can further include: the destination management and control component is an RC, and the configuration set is the connection identifier to be optimized. On the basis of a destination management and control component RC in configuration information in the first data processing request, the configuration set in the first data processing request is converted into the configuration interface and the parameters in the third data processing request, that is, the configuration interface is starting rerouting, and the parameter is the link identifier in the configuration set.

In the present embodiment, data returned by the source management and control component may also be analyzed, a destination management and control component to be interacted with is determined, and a third data processing request is generated, wherein the third data processing request includes an operation command configured to the destination management and control component.

Step 6, send the third data processing request to a destination management and control component RC.

Step 7, the destination management and control component RC processes the third data processing request, and returns an execution result.

Step 8, end.

Figure 4:
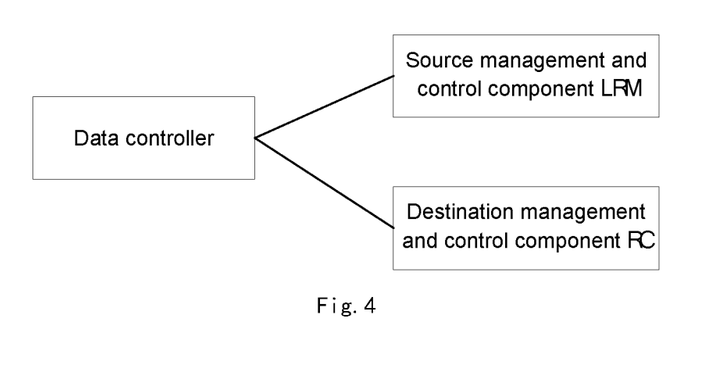
FIG. 4 is block diagram 2 of a data processing apparatus according to the preferred embodiment.

FIG. 4 is block diagram 2 of a data processing apparatus according to the preferred embodiment. As shown in FIG. 4, in the present embodiment, a data controller receives an external request to monitor the occupation of an optical transmission net (OTN) in an LRM, and when a specified link resource occupation ratio rate exceeds a certain threshold, automatically starts optimization of a connection route passing through the link.

Step 1, after receiving a first data processing request, a data controller determines a source management and control component to be interacted with.

In an embodiment, the source management and control component to be interacted with is determined on the basis of the directory service information between the first data processing request and the source management and control component.

In an embodiment, in the first data processing request, a source management and control component to be interacted with is indicated.

In the present embodiment, in the first data processing request, it indicates that the source management and control component to be interacted with is an LRM.

Figure 5:
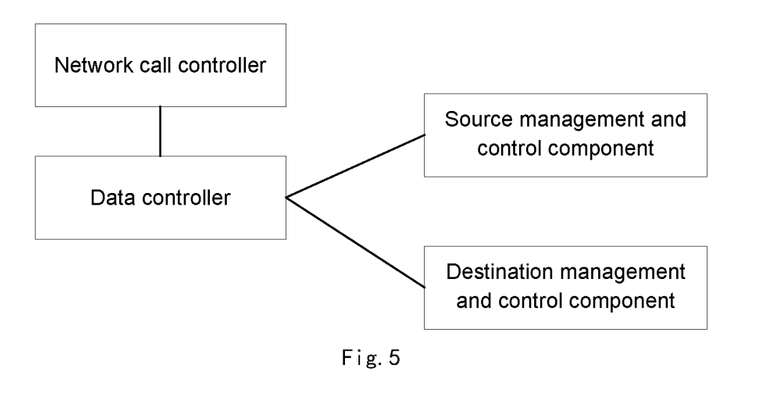
FIG. 5 is block diagram 3 of a data processing apparatus according to the present preferred embodiment.

In an embodiment, FIG. 5 is a block diagram 3 of a data processing apparatus according to the preferred embodiment of the present disclosure, and as shown in FIG. 5, the first data processing request is from a network call controller.

Figure 6:
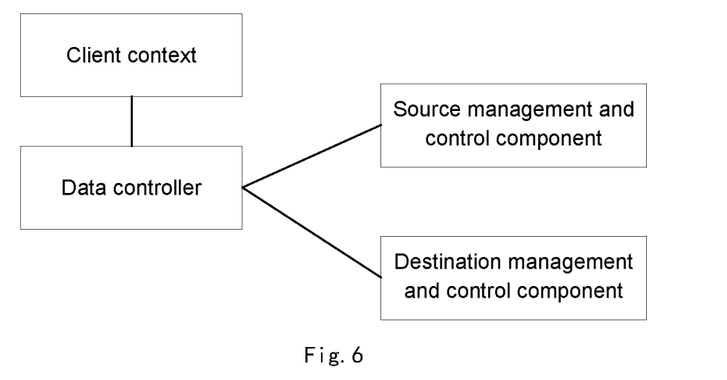
FIG. 6 is block diagram 4 of a data processing apparatus according to the present preferred embodiment.

In an embodiment, FIG. 6 is block diagram 4 of a data processing apparatus according to the present preferred embodiment, and as shown in FIG. 6, the first data processing request is from client context.

Figure 7:
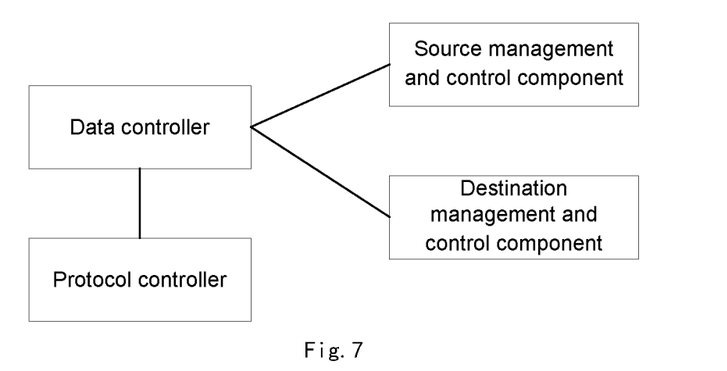
FIG. 7 is block diagram 5 of a data processing apparatus according to the present preferred embodiment.

In an embodiment, FIG. 7 is a block diagram 5 of a data processing apparatus according to the preferred embodiment of the present disclosure, and as shown in FIG. 7, the first data processing request is used to negotiate a controller.

Step 2, if there is a source management and control component, generate a second data processing request; otherwise, proceed to Step 5.

In an embodiment, the second data processing request carries data collection standards such as the type of data to be collected and the start and end time of data update. In addition, the data collecting standard further includes the transmission manner of collected data, such as returning data in real time and periodically updating.

In the present embodiment, the type of the data to be collected carried in the second data processing request is a link occupation ratio, which is specifically an OTN link occupation ratio; a real-time return link occupation ratio.

Other types of data also include Ethernet link occupation ratio, SDH link occupation ratio, etc.

Step 3, send the second data processing request to a source management and control component.

In the present embodiment, the data controller sends the second data processing request to the source management and control component LRM.

Step 4, the source management and control component processes the received data processing request, and returns the collected data.

The source management and control component LRM in the present embodiment collects data complying with a collection standard, that is, link occupation ratio data, and returns the data to the data controller.

In an embodiment, as shown in FIG. 5, the returned data is sent to the network call controller.

The network call controller may further forward the returned data to other management and control components or management and control systems.

In an embodiment, as shown in FIG. 6, the returned data is sent to the client context.

The returned data is transmitted to the service context connected to the client context by means of the client context.

In an embodiment, as shown in FIG. 7, the returned data is sent to the protocol controller; and the returned data is sent to another management and control system or application connected to the protocol controller by using the protocol controller.

Step 5, determine a destination management and control component to be interacted with, and if there is a destination management and control component, generate a third data processing request; otherwise, proceed to Step 8.

In the present embodiment, the destination management and control component is designated as the RC in the case of the first data processing.

According to the link occupation ratio data collected by an LRM, it is determined whether a link occupation ratio exceeds a specified threshold; and when the threshold is exceeded, it is necessary to start routing optimization, thereby generating a third data processing request, wherein the parameters include a link of which the link occupation ratio exceeds the specified threshold, and the rerouting is specified to avoid the link.

In the management and control system, in addition to an RC being configurable to perform route optimization and route calculation, a CC component can be configured to perform operations such as connection creation and deletion; an LRM can be configured to change the management state of a link transmission resource; an NCC can be configured to initiate a network call of a local layer or a cross layer; and a TAP can be configured to change a transmission resource crossing and operation, administration and maintenance (OAM) state.

Step 6, send the third data processing request to a destination management and control component RC.

Step 7, the destination management and control component RC processes the third data processing request, and returns an execution result.

Further, as shown in FIG. 5, the execution result is sent to the network call controller;

the network call controller further forwards the execution result to other management and control components or management and control systems.

Further, as shown in FIG. 6, the execution result is sent to the client context; and by means of the client context, the execution result is transmitted to service context connected to the client context.

Further, as shown in FIG. 7, the execution result is sent to the protocol controller;

the returned data is sent to another management and control system or application connected to the protocol controller by using the protocol controller.

Step 8: end.

Figure 8:
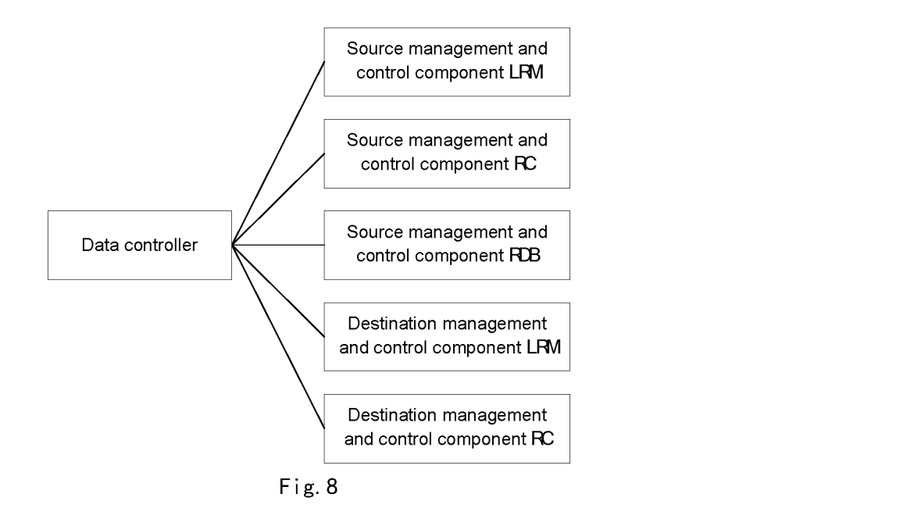
FIG. 8 is block diagram 6 of a data processing apparatus according to the present preferred embodiment.

FIG. 8 is block diagram 6 of a data processing apparatus according to the present preferred embodiment; as shown in FIG. 8, in the present embodiment, a data controller receives an external request to monitor the occupation of OTN link resources in an LRM, and predicts link resource occupation according to historical occupation data. When the predicted link resource occupation rate exceeds a certain threshold, resource reallocation is limited by modifying the management state of a transmitted resource, and a connection in the link is migrated to another link by means of connection routing optimization.

Step 1, after receiving a first data processing request, a data controller determines a source management and control component to be interacted with.

In an embodiment, the source management and control component to be interacted with is determined on the basis of the directory service information between the first data processing request and the source management and control component.

In an embodiment, in the first data processing request, a source management and control component to be interacted with is indicated.

In the present embodiment, in the first data processing request, it indicates that the source management and control components to be interacted with are an LRM, an RC and an RDB.

In an embodiment, as shown in FIG. 5, the first data processing request is from a network call controller.

In an embodiment, as shown in FIG. 6, the first data processing request is from client context.

In an embodiment, as shown in FIG. 7, the first data processing request is used to negotiate a controller.

Step 2, if there is a source management and control component, generate a second data processing request; otherwise, proceed to Step 5.

In an embodiment, the second data processing request carries data collection standards such as the type of data to be collected and the start and end time of data update. In addition, the data collecting standard further includes the transmission manner of collected data, such as returning data in real time and periodically updating.

In the present embodiment, there are a plurality of source management and control components for collecting various types of data.

When the second data processing request is constructed, the type of the data to be collected carried in the second data processing request that may be sent to the LRM is a link occupation ratio, specifically, an OTN link occupation ratio; the type of the data to be collected carried in the second data processing request sent to the RC is a topology, specifically, an OTN topology; the type of the data to be collected carried in the second data processing request sent to the RDB is historical connection data, which specifically includes connection information maintained within a specified period of time, such as the number of connections, and routing information of each connection.

The source management and control component and the corresponding type of data may also be specified in the second data processing request, specifically as follows: the type of the data to be collected, designated to be sent to the LRM, in the second data processing request is a link occupation ratio, specifically an OTN link occupation ratio; the type of the data to be collected, designated to be sent to the RC, in the second data processing request is a topology, specifically an OTN topology; the type of the data to be collected, designated to be sent to the RDB, in the second data processing request is historical connection data, which specifically includes connection information maintained within a specified period of time, such as the number of connections, and routing information of each connection.

Step 3, send the second data processing request to a source management and control component.

In the present embodiment, the data controller sends the second data processing request to the source management and control component LRM, RC, and RDB.

Step 4, the source management and control component processes the received data processing request, and returns the collected data.

The source management and control component LRM in the present embodiment collects data complying with a collection standard, that is, link occupation ratio data, and returns the data to the data controller; the source management and control component RC collects data complying with a collection standard, i.e. topology data, and returns the data to a data controller; the source management and control component RDB collects data complying with a collection standard, i.e. historical connection data, and returns the data to the data controller.

In an embodiment, as shown in FIG. 5, the returned data is sent to the network call controller.

The network call controller may further forward the returned data to other management and control components or management and control systems.

In an embodiment, as shown in FIG. 6, the returned data is sent to the client context.

The returned data is transmitted to the service context connected to the client context by means of the client context.

In an embodiment, as shown in FIG. 7, the returned data is sent to the protocol controller;

the returned data is sent to another management and control system or application connected to the protocol controller by using the protocol controller.

Step 5, determine a destination management and control component to be interacted with, and if there is a destination management and control component, generate a third data processing request; otherwise, proceed to Step 8.

In the present embodiment, the destination management and control component is designated as an LRM and an RC in the case of the first data processing.

According to the link occupation ratio data collected from the LRM, the historical connection data collected from the RDB, and the topology data collected from the RC, it is predicted and determined that the link occupation ratio may exceed the specified threshold. The simple prediction and determination method includes linear prediction based on the time for establishing/deleting a historical connection, the number of maintained connections, etc. When it is predicted that a threshold is exceeded, a third data processing request sent to an LRM is generated, wherein it is determined that a configuration interface is a management state for modifying a transmission resource, and the parameter includes: changing the management state from enabling to disabling; a third data processing request sent to an RC is generated, wherein it is determined that a configuration interface is starting rerouting, the parameters include a link of which the predicted link occupation ratio exceeds the specified threshold, and the rerouting is specified to avoid the link.

Step 6, send the third data processing request to the destination management and control components LRM and RC.

Step 7, the destination management and control components LRM and RC process a third data processing request, and return the execution result.

Further, as shown in FIG. 5, the execution result is sent to the network call controller;

the network call controller further forwards the execution result to other management and control components or management and control systems.

Further, as shown in FIG. 6, the execution result is sent to the client context; and by means of the client context, the execution result is transmitted to service context connected to the client context.

Further, as shown in FIG. 7, the execution result is sent to the protocol controller;

the returned data is sent to another management and control system or application connected to the protocol controller by using the protocol controller.

Step 8: end.

From the description of the described embodiments, a person skilled in the art would have been able to clearly understand that the methods in the described embodiments may be implemented by using software and necessary general hardware platforms, and of course may also be implemented using hardware, but in many cases, the former is a better embodiment. On the basis of such understanding, the portion of the technical solution of the present disclosure that contributes in essence or to the prior art may be embodied in the form of a software product. The computer software product is stored in a storage medium (such as an ROM/RAM, a magnetic disk and an optical disc), and includes several instructions for enabling a terminal device (which may be a mobile phone, a computer, a server, or a network device, etc.) to execute the methods described in various embodiments of the present disclosure.

The present embodiment further provides a data processing apparatus, the apparatus is configured to implement the described embodiments and preferred embodiments, and what has been described will not be repeated again. As used below, the term "module" may implement a combination of software and/or hardware of predetermined functions. Although the apparatus described in the following embodiments is in an embodiment implemented in software, implementation in hardware or a combination of software and hardware is also possible and could have been conceived.

Figure 9:
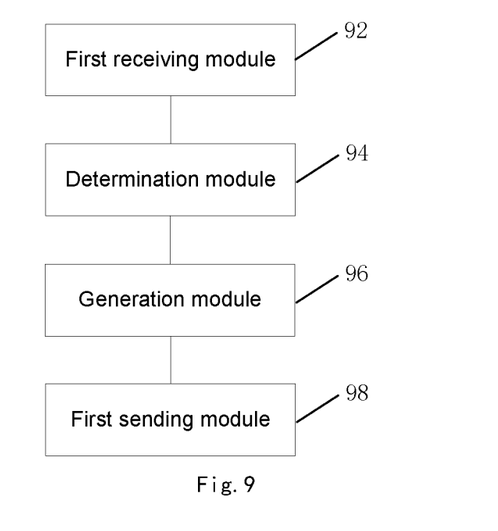
FIG. 9 is a structural block diagram of a data processing apparatus according to some embodiments of the present disclosure.

FIG. 9 is a structural block diagram of a data processing apparatus according to some embodiments of the present disclosure. As shown in FIG. 9, the apparatus includes:

a first receiving module 92, configured to receive a first data processing request, wherein the first data processing request carries data collection information and/or configuration information;

a determination module 94 configured to determine a target management and control component;

a generation module 96 configured to generate a second data processing request according to the first data processing request; and a first sending module 98, configured to send the second data processing request to the target management and control component, wherein the target management and control component is used for collecting data or configuring according to the second data processing request.

In an exemplary embodiment, the determination module 94 includes:

a first determination submodule, configured to determine a first management and control component according to the data collection information, wherein the first management and control component is used for collecting data according to the second data processing request, and the target management and control component is the first management and control component; and/or a second determination submodule, configured to determine a second management and control component according to the configuration information, wherein the second management and control component is configured according to the second data processing request, and the target management and control component is the second management and control component.

In an exemplary embodiment, the first determination submodule is further configured to:

determining the first management and control component on the basis of the first data processing request and directory service information of a management and control component, or determining that a management and control component indicated by the data collection information is the first management and control component.

In an exemplary embodiment, the second determination submodule is further configured to:

determining the second management and control component on the basis of the first data processing request and the directory service information of the management and control component; or determining that the management and control component indicated by the configuration information is the second management and control component.

In an exemplary embodiment, the generation module 96 includes:
  a first generation submodule, configured to generate, in cases where the target management and control component is the first management and control component, a data collection request according to the data collection information, wherein the second data processing request is the data collection request, and the data collection request further carries at least one of the following: the type of data to be collected, the start and end time of data update, and the transmission manner of collected data; and
  a second generation submodule, configured to, when the target management and control component is the second management and control component, generate a configuration request according to the configuration information or generate the configuration request according to the configuration information and a data processing result returned by the first management and control component, wherein the second data processing request is the data collection request, and the configuration request carries a configuration interface and parameters.

In an exemplary embodiment, the type of data may include link occupation ratio and/or topology.

In an exemplary embodiment, the first receiving module 92 includes:
  a first receiving submodule, configured to receive the first data processing request sent by the network call controller; or
  a second receiving submodule, configured to receive the first data processing request sent by the client context; or
  a third receiving submodule, configured to receive the first data processing request sent by the protocol controller.

In an exemplary embodiment, after sending the second data processing request to the target management and control component, the apparatus further includes:
  a second receiving module, configured to receive a data processing result returned by the target management and control component;
  a second sending module, configured to send the data processing result to the network call controller, the client context or the protocol controller.

In another exemplary embodiment, the first management and control component includes a link resources manager (LRM), a routing controller (RC), a connection controller (CC), a network call controller (NCC), a routing database (RDB) and a termination and adaptation performer (TAP), and the second management and control component includes a link resources manager (LRM), a routing controller (RC), a connection controller (CC), a network call controller (NCC), a routing database (RDB) and a termination and adaptation performer (TAP).

It should be noted that the described modules may be implemented by software or hardware. The latter may be implemented in the following manner, but is not limited thereto: all the described modules are located in the same processor; or all the modules are located in different processors in any arbitrary combination manner.

Embodiments of the present disclosure further provide a computer-readable storage medium, the computer-readable storage medium stores a computer program, wherein the computer program is configured to execute, when running, the steps in any one of the method embodiments.

In some exemplary embodiments, the computer-readable storage medium may include, but is not limited to: any medium that can store a computer program, such as a USB flash drive, a Read-Only Memory (ROM for short), a Random Access Memory (RAM for short), a removable hard disk, a magnetic disk, or an optical disc.

Embodiments of the present disclosure further provide an electronic apparatus, including a memory and a processor; wherein the memory stores a computer program, and the processor is configured to run the computer program to execute the steps in any one of the method embodiments.

In some exemplary embodiments, the electronic apparatus can further include a transmission device and an input/output device, wherein the transmission device is connected to the processor, and the input/output device is connected to the processor.

For specific examples in the present embodiment, reference can be made to the examples described in the described embodiments and exemplary embodiments, and thus they will not be repeated again in the present embodiment.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. They may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Hence, the present disclosure is not limited to any specific combinations of hardware and software.

The above is only preferred embodiments of the invention and is not intended to limit the present disclosure. Those skilled in the art may make various modifications and variations. Any modifications, equivalent replacements, improvements, etc. made within the spirit and principle of the present disclosure shall all fall within the scope of protection some embodiments of the present disclosure.

What is claimed is:

1. A data processing method, comprising:
  receiving a first data processing request, wherein the first data processing request carries data collection information and/or configuration information;
  determining, according to the data collection information and/or the configuration information, a target management and control component, wherein the target management and control component comprises at least one of: a link resources manager (LRM), a routing controller (RC), a connection controller (CC), a network call controller (NCC), a resource database (RDB) or a termination and adaptation performer (TAP);
  generating a second data processing request according to the first data processing request; and
  sending the second data processing request to the target management and control component, wherein the target management and control component is used for collecting or configuring data according to the second data processing request;
  wherein determining the target management and control component comprises:
    determining a first management and control component according to the data collection information, wherein the first management and control component is used for collecting data according to the second data processing request, and the target management and control component is the first management and control component; and determining a second management and control component according to the configuration information, wherein the second management and control component is configured according to the second data processing request, and the target management and control component is the second management and control component;

wherein generating the second data processing request according to the first data processing request comprises:

in cases where the target management and control component is the first management and control component, generating a data collection request according to the data collection information, wherein the second data processing request is the data collection request, and the data collection request further carries at least one of the following: the type of data to be collected, the start and end time of data update, and the transmission manner of collected data; and in cases where the target management and control component is the second management and control component, generating a configuration request according to the configuration information and a data processing result returned by the first management and control component, wherein the second data processing request is the configuration request, and the configuration request carries a configuration interface and parameters.

2. The method according to claim 1, wherein receiving the first data processing request comprises:

receiving the first data processing request sent by a network call controller; or receiving the first data processing request sent by client context; or receiving the first data processing request sent by a protocol controller.

3. The method according to claim 2, wherein after sending the second data processing request to the target management and control component, the method further comprises:

receiving a data processing result returned by the target management and control component; and sending the data processing result to the network call controller, the client context or the protocol controller.

4. An electronic device, comprising a memory and a processor, wherein the memory stores a computer program, and the processor is configured to run the computer program so as to execute the method as claimed in claim 3.

5. An electronic device, comprising a memory and a processor, wherein the memory stores a computer program, and the processor is configured to run the computer program so as to execute the method as claimed in claim 2.

6. The method according to claim 1, wherein determining the first management and control component according to the data collection information comprises:

determining the first management and control component on the basis of the first data processing request and directory service information of a management and control component, or determining that a management and control component indicated by the data collection information is the first management and control component.

7. An electronic device, comprising a memory and a processor, wherein the memory stores a computer program, and the processor is configured to run the computer program so as to execute the method as claimed in claim 6.

8. The method according to claim 1, wherein determining the second management and control component according to the configuration information comprises:

determining the second management and control component on the basis of the first data processing request and the directory service information of the management and control component; or determining that the management and control component indicated by the configuration information is the second management and control component.

9. An electronic device, comprising a memory and a processor, wherein the memory stores a computer program, and the processor is configured to run the computer program so as to execute the method as claimed in claim 8.

10. The method according to claim 9, wherein the data type comprises: link occupation ratio and/or topology.

11. An electronic device, comprising a memory and a processor, wherein the memory stores a computer program, and the processor is configured to run the computer program so as to execute the method as claimed in claim 10.

12. The method according to claim 1, wherein the first management and control component comprises a link resources manager (LRM), a routing controller (RC), a connection controller (CC), a network call controller (NCC), a resource database (RDB) and a termination and adaptation performer (TAP), and the second management and control component comprises a link resources manager (LRM), a routing controller (RC), a connection controller (CC), a network call controller (NCC), a resource database (RDB) and a termination and adaptation performer (TAP).

13. An electronic device, comprising a memory and a processor, wherein the memory stores a computer program, and the processor is configured to run the computer program so as to execute the method as claimed in claim 12.

14. A non-transitory computer readable storage medium, the computer-readable storage medium storing a computer program therein, wherein the computer program is configured to execute the method as claimed in claim 1.

15. An electronic device, comprising a memory and a processor, wherein the memory stores a computer program, and the processor is configured to run the computer program so as to execute the method as claimed in claim 1.

16. A data processing apparatus comprising:

a first receiving module, configured to receive a first data processing request, wherein the first data processing request carries data collection information and/or configuration information;

a determination module, configured to determine, according to the data collection information and/or the configuration information, a target management and control component, wherein the target management and control component comprises at least one of: a link resources manager (LRM), a routing controller (RC), a connection controller (CC), a network call controller (NCC), a resource database (RDB) or a termination and adaptation performer (TAP);

a generation module configured to generate a second data processing request according to the first data processing request; and a first sending module, configured to send the second data processing request to the target management and control component, wherein the target management and control component is used for collecting or configuring data according to the second data processing request;

wherein the determination module is further configured to: determine a first management and control component according to the data collection information, wherein the first management and control component is used for collecting data according to the second data processing request, and the target management and control component is the first management and control component; and determine a second management and control component according to the configuration information, wherein the second management and control component is configured according to the second data processing request, and the target management and control component is the second management and control component;

wherein the first sending module is further configured to: in cases where the target management and control component is the first management and control component, generate a data collection request according to the data collection information, wherein the second data processing request is the data collection request, and the data collection request further carries at least one of the following: the type of data to be collected, the start and end time of data update, and the transmission manner of collected data; and in cases where the target management and control component is the second management and control component, generate the configuration request according to the configuration information and a data processing result returned by the first management and control component, wherein the second data processing request is the configuration request, and the configuration request carries a configuration interface and parameters.

* * * * *